United States Patent

Schwartz

[19]

[11] Patent Number: 5,877,905

[45] Date of Patent: Mar. 2, 1999

[54] MOUNT FOR TELESCOPE MIRRORS

[76] Inventor: Richard A. Schwartz, 14358 S. Yukon Ave., Hawthorne, Calif. 90250

[21] Appl. No.: 834,638

[22] Filed: Apr. 14, 1997

[51] Int. Cl.$^6$ .............................. G02B 5/08; G02B 7/182; A47F 1/14
[52] U.S. Cl. ....................... 359/846; 359/849; 359/871; 359/900; 248/466
[58] Field of Search ..................... 359/846, 848, 359/849, 871, 872, 399, 900; 248/466, 475.1

[56] References Cited

U.S. PATENT DOCUMENTS

| | | |
|---|---|---|
| 3,182,552 | 5/1965 | Audy . |
| 4,245,895 | 1/1981 | Wildenrotter .......................... 359/848 |
| 4,420,223 | 12/1983 | Watanabe et al. ...................... 359/848 |
| 4,502,200 | 3/1985 | Anderson et al. ....................... 29/526 |
| 4,632,523 | 12/1986 | Knohl .................................... 359/848 |
| 5,035,495 | 7/1991 | Toyoda et al. .......................... 359/512 |
| 5,151,809 | 9/1992 | Meier .................................... 359/846 |
| 5,160,780 | 11/1992 | Ono et al. .............................. 428/220 |
| 5,414,564 | 5/1995 | Pausch et al. .......................... 359/846 |
| 5,434,697 | 7/1995 | Ameer ................................... 359/224 |

FOREIGN PATENT DOCUMENTS 1039252   9/1958   Germany ............................... 359/849

OTHER PUBLICATIONS

Taki, Toshimi, "Mirror Support: 3 or 9 Points?", Sky and Telescope, Sep., 1994, pp. 84–87.
Taki, Toshimi, "More Thoughts on Mirror–Cell Design", Sky and Telescope, Apr. 1996, pp. 75–77.
Berry, Richard, *Build Your Own Telescope*, Scribner, NY 1985, pp. 165–169.

*Primary Examiner*—Ricky D. Shafer
*Assistant Examiner*—Mark A. Robinson
*Attorney, Agent, or Firm*—Norton R. Townsley

[57] ABSTRACT

An improved support for a telescope mirror using a system of three bars which are joined at their ends to the back of the mirror with compliant adhesive pads. Preferably, one end is joined to the center of the mirror while the others are joined on the circumference of a circle centered on the center of the mirror. In this preferred embodiment, there is an approximately right triangular relationship between the centers of the bars. The backs of the bars are coupled at their centers to mirror adjusting mechanisms by further compliant pads. The numbers of support points can be increased by coupling further bars or triangles between the circumferential support points of the original three bars and the back of the mirror. Again coupling is provided by compliant adhesive pads. The thickness and size of all pads are controlled to provide stiff support in compression and shear along with resilient support in bending. The preferred geometry of the support configuration of the back of the mirror makes collimation easier by decoupling altitude and azimuth adjustments. Stress-free assembly of the mirror and its supports is accomplished by applying the adhesive pads in liquid form, then allowing the pads to cure while the components are supported with spacers. Because the pads are pliable, spacers are easily removed after curing and, should there be any need to disassemble the mirror, the thickness of the pads allows for easy cutting.

6 Claims, 9 Drawing Sheets

MOUNT FOR TELESCOPE MIRRORS

BACKGROUND OF THE INVENTION

The present invention relates to the field of telescopes and more particularly to mirrors used in such telescopes.

In a regular, Newtonian telescope, there is typically a telescope tube at the end of which is a curved silvered mirror, usually made out of glass. The mirror is supported on three points which are attached to the end of the telescope tube. This allows adjustment of the mirror in one plane. The edge of the mirror is stabilized by an edge support, and safety clips retain the mirror in case the telescope should accidently point below the horizon. This kind of three point support is useful for mirrors up to about 8 inches in diameter. Smaller mirrors can be made relatively thin but larger mirrors must be made thicker in order to reduce sagging. In larger mirrors, therefore, support is provided by more than three points. At each of the three main support points there are bars or triangles which spread the force applied by the mirror over a larger area. Consequently, the number of support points is usually a multiple of three.

Spreading of the force is important because without something that will spread the force, the mirror will deform thus affecting focusing, adjustment of the entire telescope and impairing image quality and communications gain. The problems with this kind of mirror mounting are that the supports must be loose to avoid stressing the mirror and degrading its performance. Also, the retaining clips obscure part of the mirror, introduce unwanted edge diffraction defects and may damage coatings on the mirror. Systems for larger mirrors are mechanically complex, requiring low friction bearings at the linkage points and, when the back adjustment points are in the shape of an equilateral triangle, collimation of the mirror is made more complex by the interaction between all these adjustment points. For a discussion of three and nine point support of telescope mirrors see articles by Toshimi Taki, published in the September, 1994 issue of *Sky and Telescope* from pages 84 through 87 and the April, 1996 issue from pages 75 through 77. Examples of complex support systems for telescope mirrors can be seen in U.S. Pat. No. 4,632,523, issued to Knohl on Dec. 30, 1996 and U.S. Pat. No. 3,182,552, issued to Audy on May 11, 1965.

Development of a mounting system for telescope mirrors which will allow larger, thinner mirrors to be permanently mounted in a telescope without the need for edge clips and edge supports represents a great improvement in the field of telescope design and satisfies a long-felt need of the astronomer.

SUMMARY OF THE INVENTION

The present invention is a support for a telescope mirror which replaces bearings and complex support devices, allows larger, thinner mirrors to be stiffly supported without deformation and eliminates the need for edge supports and clips. This mounting system uses a system of three bars which are coupled at their ends to the back of the mirror with compliant adhesive pads. The ends of the bars thus form support points for the mirror. These bars are preferably attached to the back of the mirror in a "pentagonal" configuration. The term "pentagonal" is used to mean that there is one center support point and the outer support points, which fall on the circumference of a circle centered on the center of the mirror, create a regular pentagon. In the preferred embodiment, there is also an approximately right triangular relationship between the centers of the bars.

The backs of the bars are coupled at their centers to mirror adjusting mechanisms by further compliant pads. The numbers of support points can be increased by coupling further bars or triangles between the circumferential support points of the original three bars and the back of the mirror. Again coupling is provided by compliant adhesive pads.

The thickness and size of all pads are controlled to provide stiff support in compression and shear along with resilient support in bending. The preferred geometry of the support configuration of the back of the mirror makes collimation easier by decoupling altitude and azimuth adjustments. Stress-free assembly of the mirror and its supports is accomplished by applying the adhesive pads in liquid form, then allowing the pads to cure while the components are supported with spacers. Because the pads are pliable, spacers are easily removed after curing and, should there be any need to disassemble the mirror, the thickness of the pads allows for easy cutting.

This improved mounting system for telescope mirrors allows better load distribution for larger mirrors and allows larger mirrors to be made of thinner glass thus saving materials and weight. An appreciation of the other aims and objectives of the present invention and an understanding of it may be achieved by referring to the accompanying drawings and description of a preferred embodiment.

DETAILED DESCRIPTION OF THE PREFERRED EMBODIMENT

Figure 1:
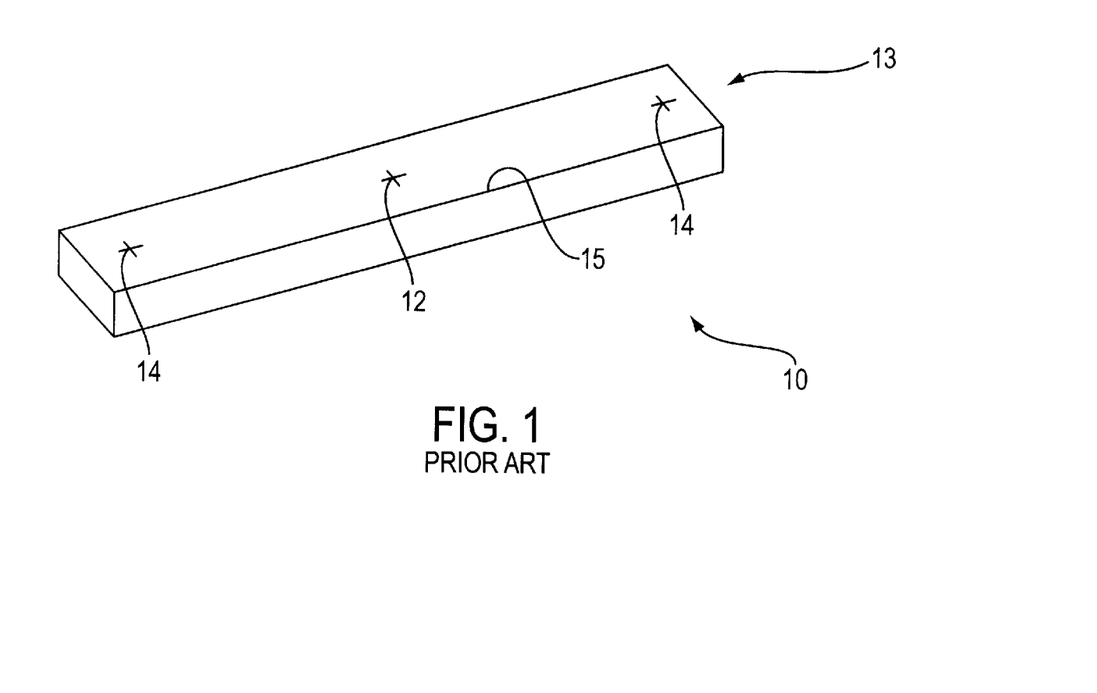
FIG. 1 is an isometric view of a typical bar used in supporting telescope mirrors.

FIG. 1 shows a bar or crossbar 10 that is used in mirror supports according to this and other inventions. The bar 10 has a center support point 12 and two end support points 14 at each end 13. The center support point 12 is in the exact center of the bar 10 as seen from the top, while the end support points 14 are equidistant from the three closest sides 15.

Figure 2:
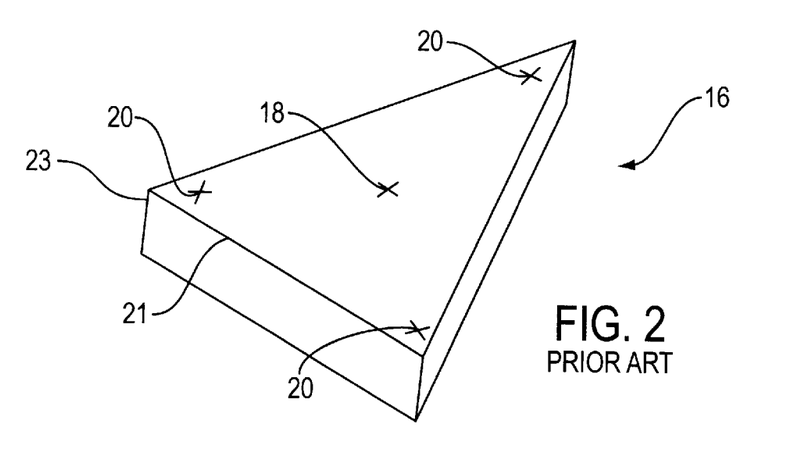
FIG. 2 is an isometric view of a typical triangle used in supporting telescope mirrors.

FIG. 2 illustrates a triangle 16 that is used in mirror supports according to this and other inventions. The triangle 16 is an isosceles triangle and has a center support point 18 and three corner support points 20 at each corner 23. The center support point 18 is in the exact center of the triangle 16 as seen from the top, while the corner support points 20 are equidistant from the two closest sides 21 and the corner 23.

Figure 3:
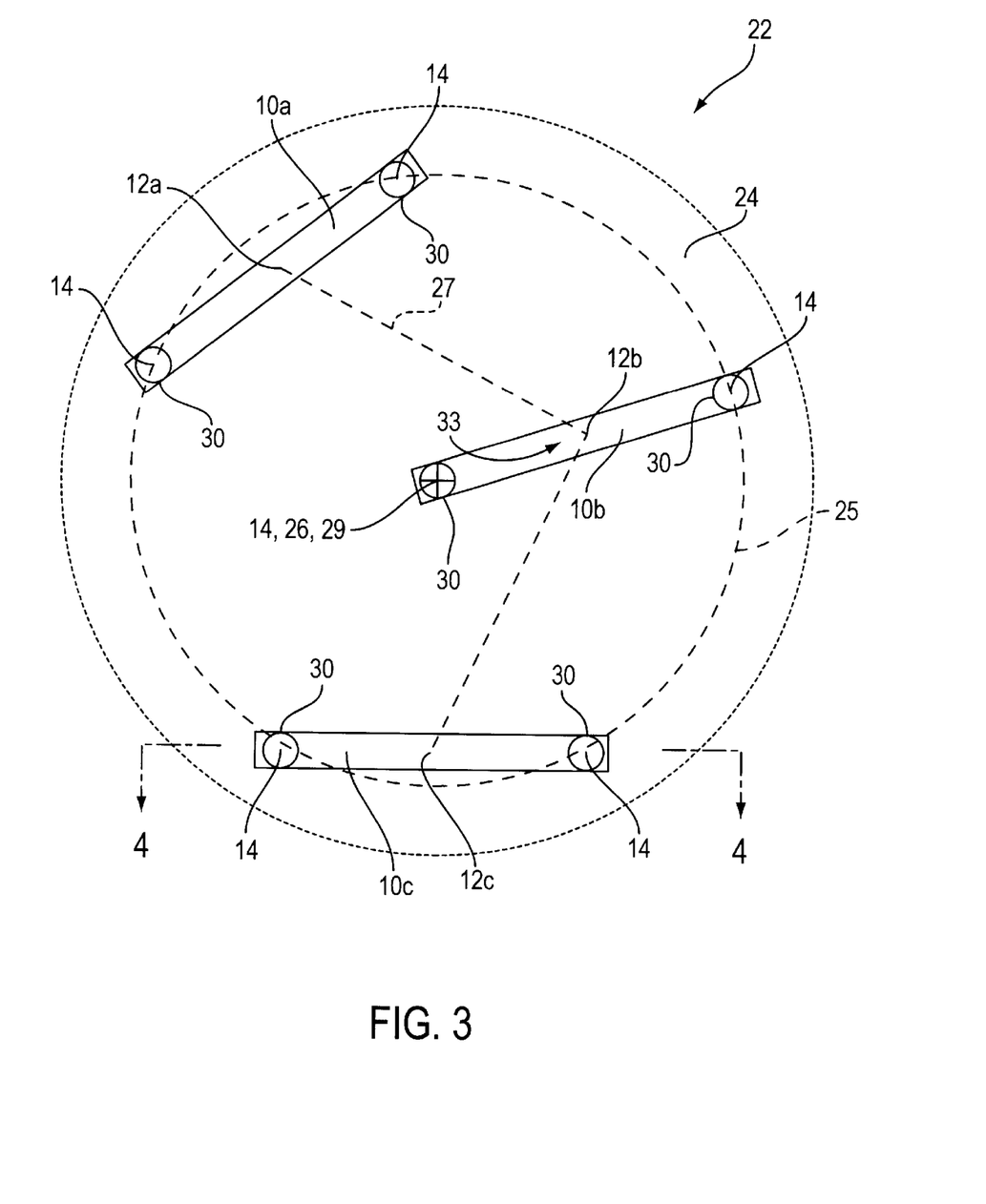
FIG. 3 is a top view of the basic mirror mounting system of this invention incorporating three bars.

FIG. 3 is a top view of the support system 22 according to this invention. In this system 22, the mirror 24 is supported by three bars 10a, 10b, 10c. Preferably, the end center support points 14 on two of the bars 10a, 10c fall on the circumference 25 of a circle whose center 26 is coincident with the center 29 of the mirror 24. The radius associated with the circumference 25 is chosen to minimize the static deformation of the mirror. Also, preferably, one end center point of 14 of one bar 10b also falls on the circumference 25 and the other end support point 14 of this bar 10b is coincident with the center 29 of the mirror 24 and the center 26 of the circle.

Furthermore, preferably, a line 27 drawn from the center 12a of bar 10a to the center 12b of bar 10b to the center 12c of bar 10c forms approximately a right angle 33 and a line (not illustrated) drawn between all the end centers 14 that fall on the circumference 25 forms a pentagon. On FIG. 3, the angle 33 is 91.4°. However, this angle 33 can vary from about 85° to 95°. This illustrates the special pentagonal geometry of this preferred, improved support system 22. The use of this pentagonal geometric, support configuration shown on FIG. 3 which has an angle 33 between the centers 12 of the bars 10 of about 90° makes collimation of the mirror 24 easier by decoupling the altitude and azimuth adjustments.

The end centers 14 of each bar 10 are coupled to the back 28 (not visible on FIG. 3) of the mirror 24 by compliant or elastomeric adhesive pads 30. These pads 30 are preferably made out of silicon rubber adhesive such as General Electric Silicone 2. The pads 30 are formed by placing a fair amount of the liquid adhesive around each of the end centers 14 and placing the mirror 24 on top of the bars 10 with spacers (not illustrated) between the back 28 of the mirror 24 and the bars 10 and allowing the adhesive to cure. The mirror 24 and bars 10 are gently pressed towards each other until there is no gap between the components and the spacers. Excess adhesive is squeezed out resulting in intimate contact between the adhesive and the components and an essentially void-free joint. As is well known, silicone adhesives cure by interaction with the moisture in the air so that sufficient cure is achieved overnight and full cure in a matter of a few days. After the adhesive is cured, then the spacers can be removed.

Figure 4:
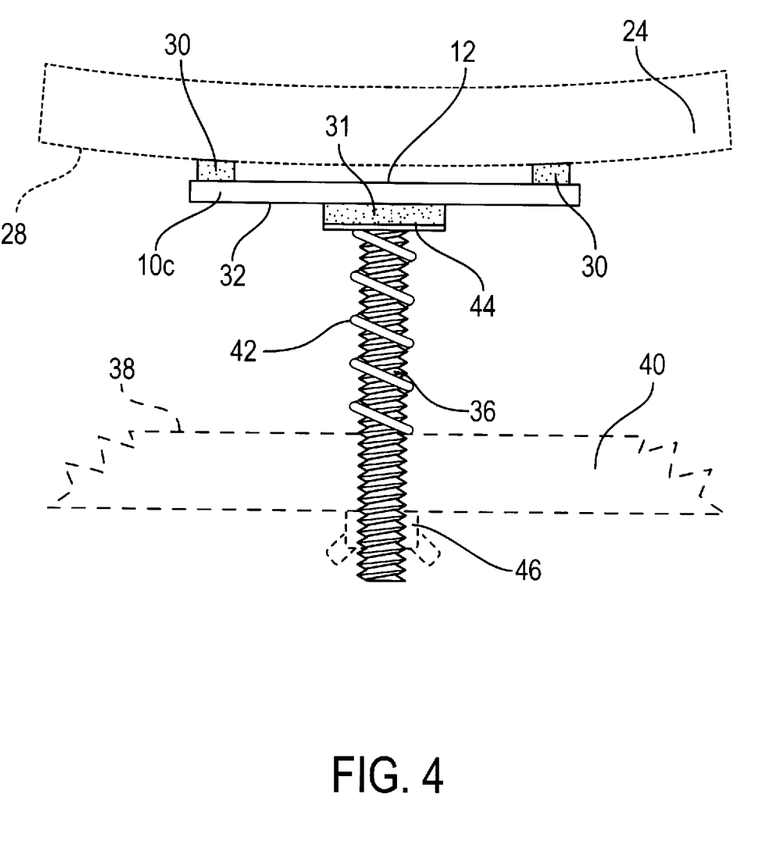
FIG. 4 is a cross section along the line 4—4 of FIG. 3.

FIG. 4 is a cross-section taken along the lines 4—4 in FIG. 3. This view shows the mirror 24, the back 28 of the mirror 24 and the adhesive pads 30 which couple the mirror 24 to the bar 10c. Another elastomeric, adhesive pad 31 couples the back 32 of the bar 10 to the adjusting screw 36. The adjusting screw 36 is aligned with the center 12 of the bar 10 and goes through the rear 40 of the telescope.

In order to provide for longitudinal adjustment of the mirror 24 in the telescope tube by the adjustment screw 36, there is typically a spring 42 between the rear 40 and the head 44 of the adjustment screw 36, and a nut, typically a wing nut 46, at the rear 40 of the telescope. It will be obvious to those familiar with the art to which this invention pertains that other methods of adjustment could easily be provided. This figure illustrates that the same method of coupling that is used to couple the mirror 24 to the bar 10c is used to couple the bar 10c to the adjusting screw 36. The bar 10c is coupled to the adjustment screw 36 by placing an amount of adhesive on the top 44 of the adjusting screw 36 and allowing the adhesive to cure while there are spacers (not illustrated) between the back 32 of the bar 10c and the front 38 of the telescope backplate 40. The adjustment screw 36 is positioned by the wing nut 46 to obtain the correct thickness of the pad 31. The bar 10c and adjustment screw 36 are pressed towards each other until there is no gap between the components and the spacers. Excess adhesive is squeezed out resulting in intimate contact between the adhesive and the components and an essentially void-free joint. After the adhesive is cured, the spacer again can be removed. FIG. 4 illustrates the improved telescope mirror support system 22 for one bar 10c. The same support structure is used at each of the other bars 10a, 10b.

Fabrication of compliant adhesive pads 30, 31, as has been described above, for mounting of telescope mirrors 24 into telescopes obviates the necessity of bearings at the support linkages and eliminates the need for edge supports and clips. The thicknesses and size of the pads 30, 31 are controlled to provide stiff support in compression and shear along with resilient support in bending.

Fabrication of the pads 30, 31 with silicone-type adhesives allows attachment of mirrors 24 with stress-free supports. Since the pads 30, 31 are pliable the spacers that are applied when the adhesive is still liquid can be easily removed after curing. Should there be a need to disassemble the mirror 24 from its support 22, a knife or saw blade can easily be inserted into the gap between the mirror 24 and the bars 10 and the bars 10 and the adjusting screws 36, and the pads 30, 31 can be easily cut.

The six point support 22 shown in FIG. 3 is just one possible configuration. An alternate embodiment 22a is shown on FIG. 5. In this embodiment 22a the configuration is increased to 11 support points by attaching five additional bars 10d, 10e, 10f, 10g, 10h at the end centers 14 of each of the original bars 10a, 10b, 10c which fall on the circumference 25. The centers 12d, 12e, 12f, 12g, 12h of these additional bars 10d, 10e, 10f, 10g, 10h must coincide with the end centers 14 of the original bars 10a, 10b, 10c. Preferably, the end centers 14 of these additional bars 10e, 10f, 10g, 10h also fall on the circumference 50 of a slightly larger, second circle whose center 52 again coincides with the center 26 of the mirror 24. The radius associated with the circumference 50 is chosen to minimize the static deformation of the mirror 24.

Figure 5:
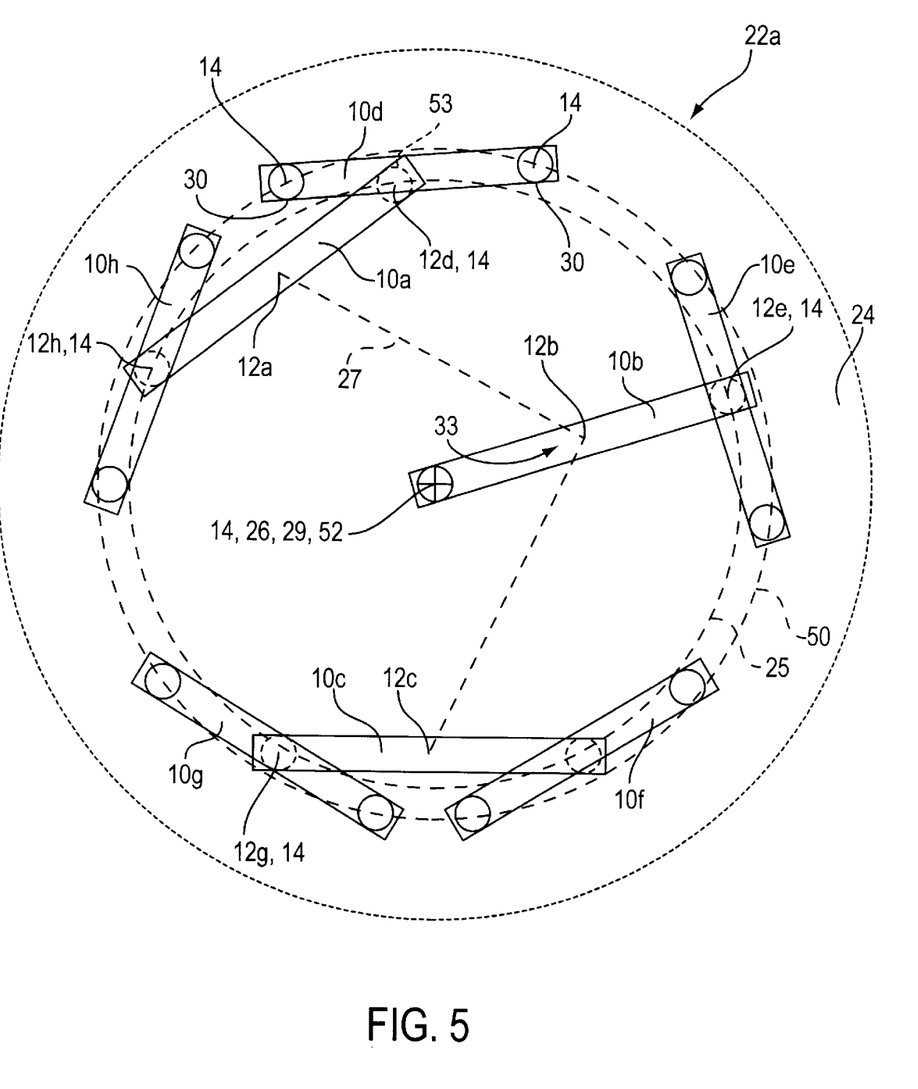
FIG. 5 is a top view of the mirror mounting system according to this invention incorporating extra bars on top of the basic three bars.

Again, preferably, a line 27 drawn from the center 12a of bar 10a to the center 12b of bar 10b to the center 12c of bar 10c forms approximately a right angle 33 and a line (not illustrated) drawn between all the end centers 14 that fall on the circumference 25 forms a pentagon. Also, compliant pads 30 couple the bars 10d, 10e, 10f, 10g, 10h to the mirror 24 and compliant pads 31 (not visible on FIG. 5) couple the bars 10a, 10b, 10c to the adjusting screws 36 (not visible on FIG. 5). Additional compliant or elastomeric pads 53 couple the original bars 10a, 10b, 10c to the additional bars 10d, 10e, 10f, 10g, 10h. These additional compliant pads 53 are fabricated in a manner identical to that previously described for the original compliant pads 30, 31. Note that to reduce complexity and ensure that FIG. 5 is comprehensible, only typical reference numerals are shown.

Figure 6:
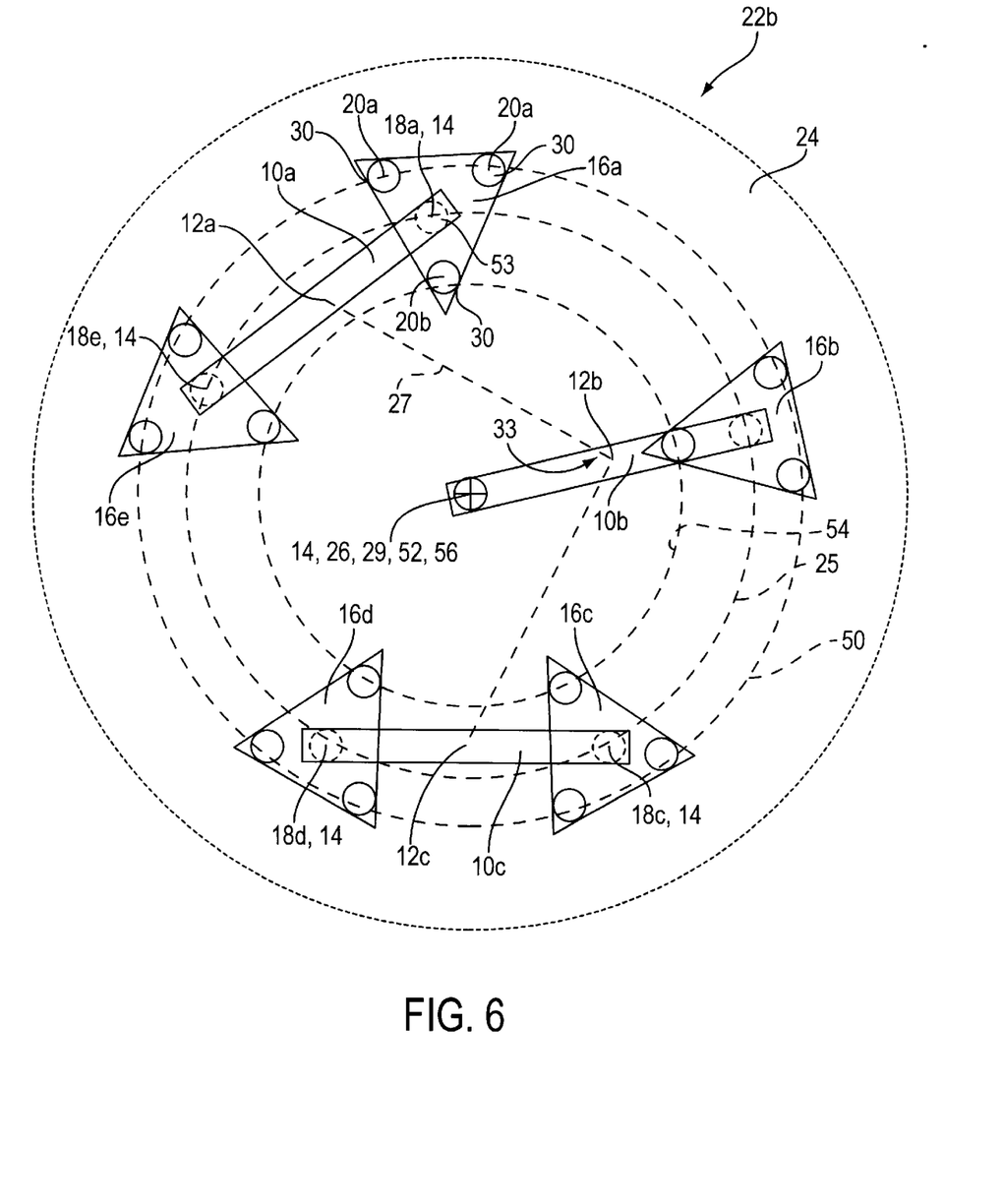
FIG. 6 is a top view of the mirror mounting system according to this invention incorporating extra triangles on top of the basic three bars.

Another alternate embodiment 22b is shown on FIG. 6. In this embodiment 22b the configuration is increased to 16 support points by attaching five additional triangles 16a, 16b, 16c, 16d, 16e at the ends 13 of each of the original bars 10a, 10b, 10c which fall on the circumference 25. The centers 18a, 18b, 18c, 18d, 18e of these additional triangles 16a, 16b, 16c, 16d, 16e must coincide with the end centers 14 of the bars 10a, 10b, 10c. Preferably, the outer end centers 20a of these additional triangles 16a, 16b, 16c, 16d, 16e also fall on the circumference 50 of a slightly larger, second circle whose center 52 again coincides with the center 26 of the mirror 24. Furthermore, the inner end centers 20b of these additional triangles 16a, 16b, 16c, 16d, 16e fall on the circumference 54 of a slightly smaller, third circle whose center 56 coincides with the other centers 26, 29, 52. The radii associated with the circumferences 52, 54 are chosen to minimize the static deformation of the mirror 24.

Again, preferably, a line 27 drawn from the center 12a of bar 10a to the center 12b of bar 10b to the center 12c of bar 10c forms approximately a right angle 33 and a line (not illustrated) drawn between all the end centers 14 that fall on the circumference 25 forms a pentagon. Compliant pads 30 couple the additional triangles 16a, 16b, 16c, 16d, 16e to the mirror 24 and compliant pads 31 (not visible on FIG. 5) couple the original bars 10a, 10b, 10c to the adjusting screws 36 (not visible on FIG. 5). Additional compliant pads 53 couple the original bars 10a, 10b, 10c to the additional triangles 16a, 16b, 16c, 16d, 16e. These additional compliant pads 53 are fabricated in a manner identical to that previously described for the other compliant pads 30, 31. Note that to reduce complexity and ensure that FIG. 6 is comprehensible, only typical reference numerals are shown.

Figure 7:
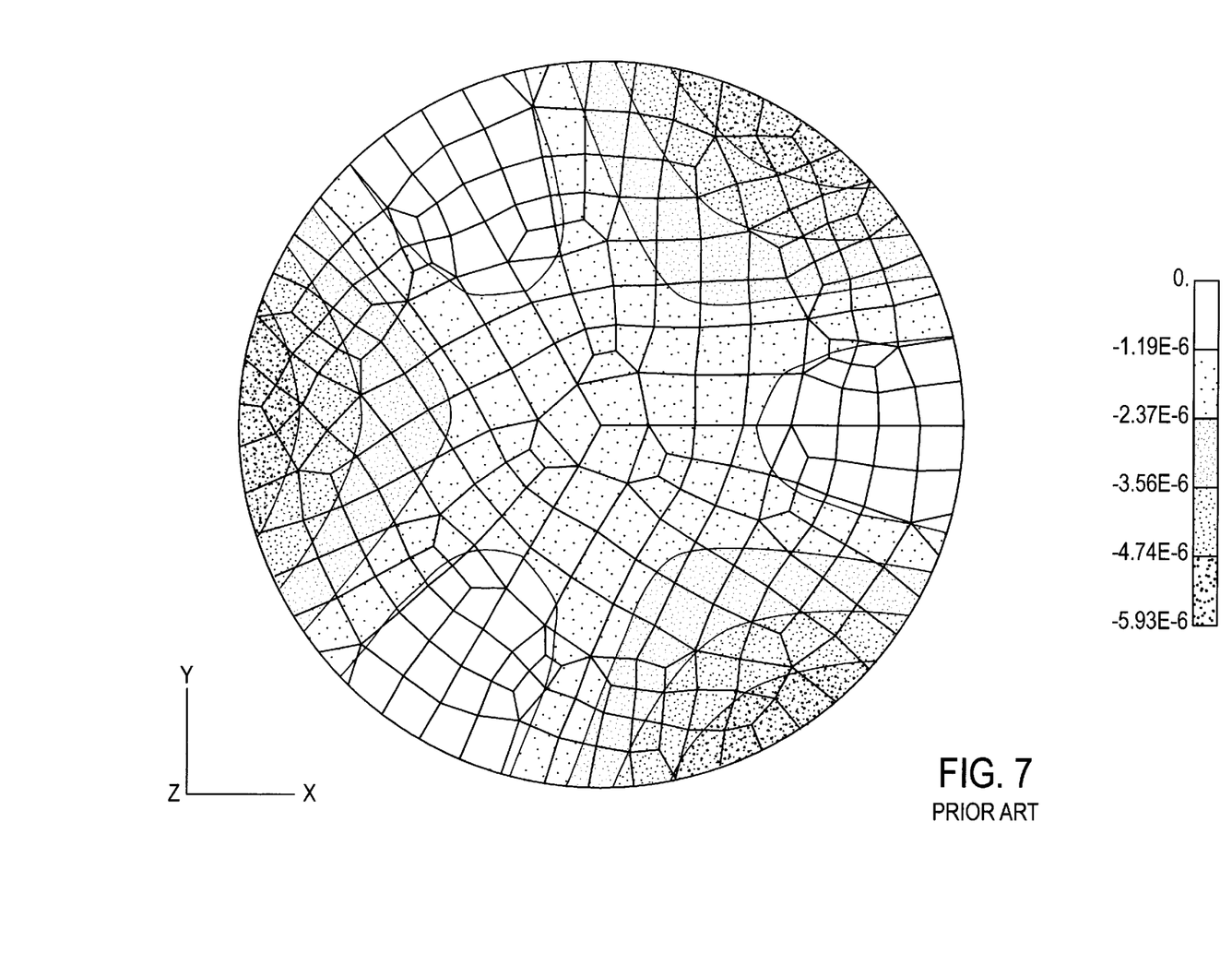
FIG. 7 is a graph showing deformation distribution for a ⅜" thick by 8" diameter mirror, under its own weight, supported at three points as in the prior art.

FIG. 7 illustrates the static deflection for a mirror 24 which has basic three point support as in the prior art.

Figure 8:
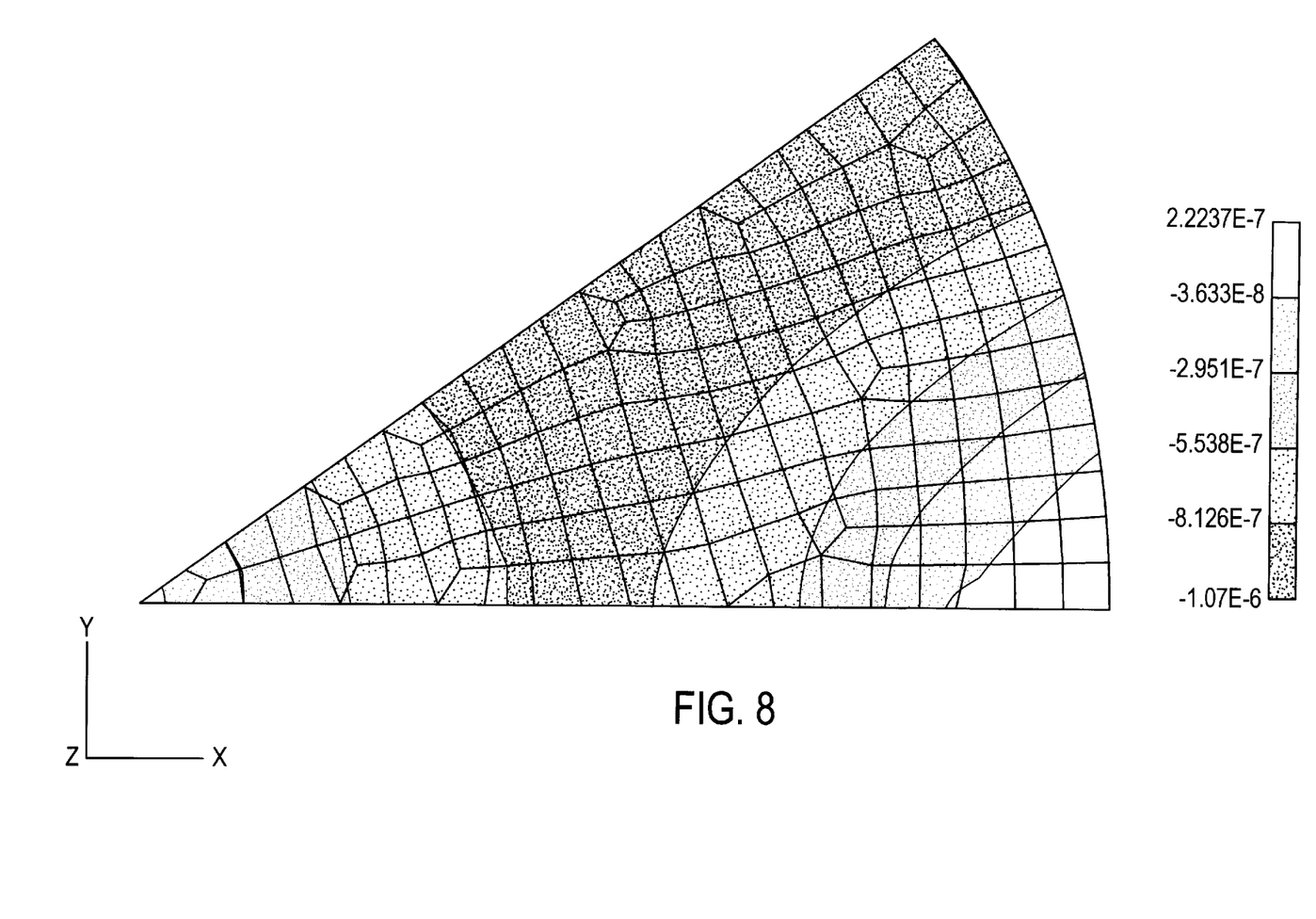
FIG. 8 is a chart showing the deformation distribution for a ⅜" thick by 8" diameter mirror, under its own weight, with the basic support system according to this invention.

FIG. 8 illustrates the static deflection on a mirror 24 which has the supporting system 22 of the current invention as shown on FIG. 3. The mirror 24 illustrated in this figure is a ⅜" by 8" and the radius of he circle 25 is 3.35".

Figure 9:
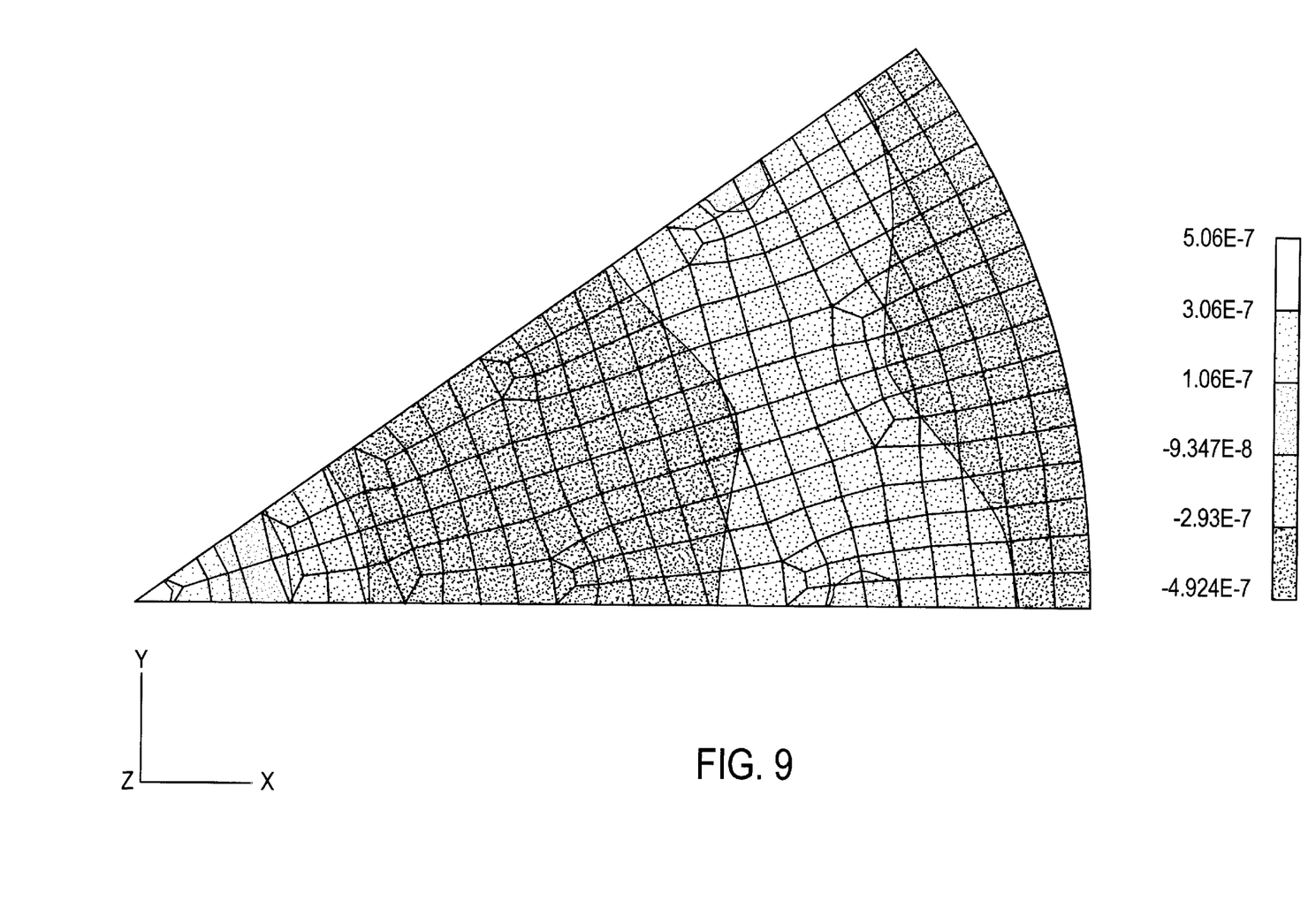
FIG. 9 is a chart showing deformation distribution for a ⅜" thick by 10" mirror, under its own weight, with 11 supports according to this invention.

FIG. 9 illustrates the stress distribution on a mirror 24 which has the supporting system 22a of the current invention as shown on FIG. 5. The mirror 24 illustrated in this figure is a ⅜" by 10" and the radius of the second circle 50 is 3.825".

Figure 10:
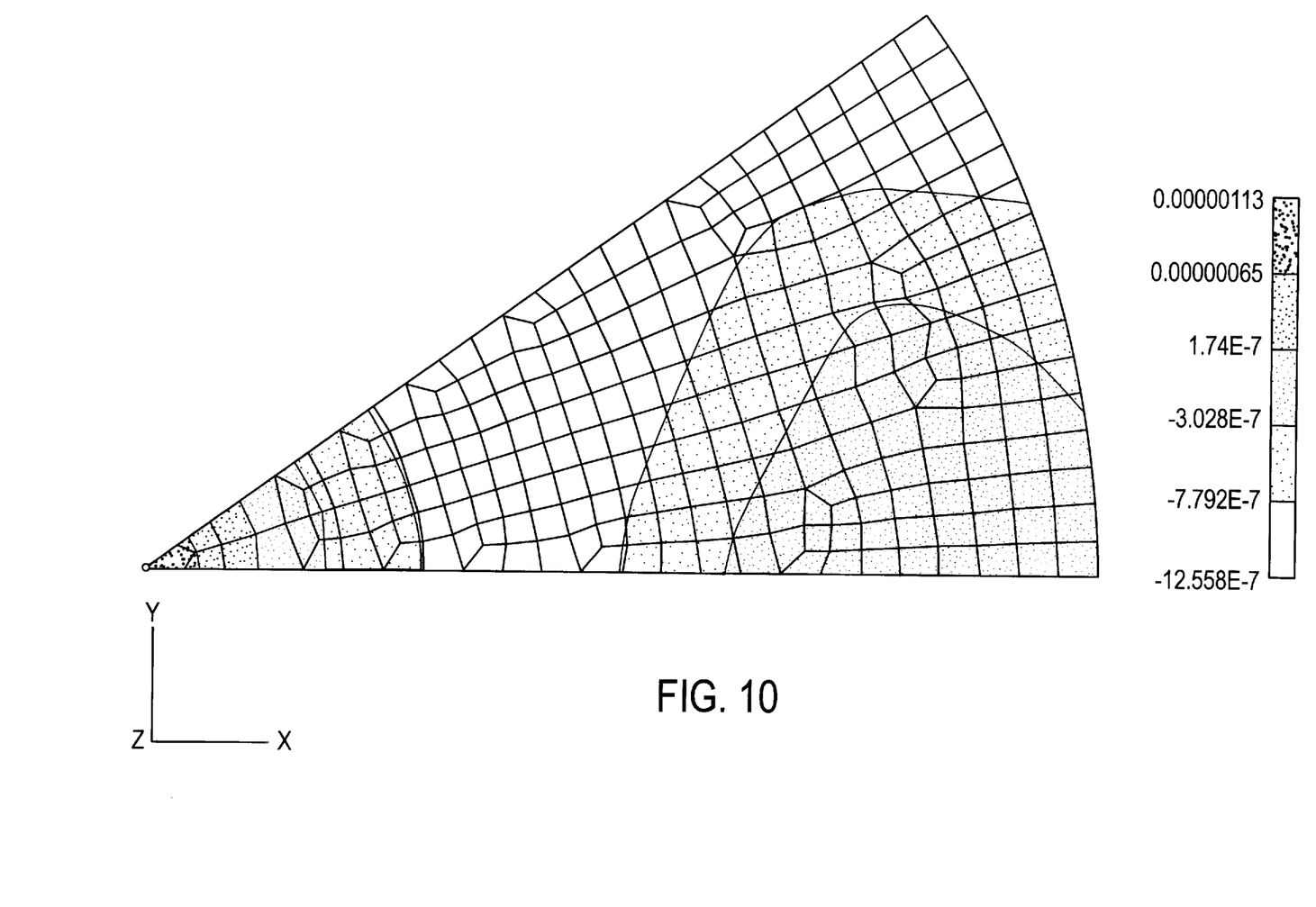
FIG. 10 is a chart showing deformation distribution for a ⅜" thick by 12½" mirror, under its own weight, with 16 supports according to this invention.

FIG. 10 illustrates the stress distribution on a mirror 24 which has the supporting system 22b of the current invention as shown on FIG. 6. The mirror 24 illustrated in this figure is a ⅜" by 12.5", the radius of the second circle 50 is 5.10000" and the radius of the third circle 54 is 4.16667".

A review of FIGS. 7 through 10 shows that using the mirror mounting systems 22, 22a and 22b of this invention reduces the stress and deformation for thin mirrors, thus allowing thin mirrors to be used up to larger diameters than was heretofore possible. The following reference numerals are used on FIGS. 1 through 6:

| | |
|---|---|
| 10 | bar |
| 10a, b, c | primary bars |
| 10d, e, f, g, h | secondary bars |
| 12 | center of bar |
| 12a, b, c | centers of primary bars |
| 12d, e, f, g, h | centers of secondary bars |
| 13 | end of bar |
| 14 | end center support point of bar |
| 15 | side of bar |
| 16 | triangle |
| 16a, b, c, d, e | secondary triangles |
| 18 | center of triangle |
| 18a, b, c, d, e | centers of secondary triangles |
| 20 | corner support point of triangle |
| 20a | outer corner support point of triangle |
| 20b | inner corner support point of triangle |
| 21 | side of triangle |

-continued

| | |
|---|---|
| 22 | support system—first embodiment |
| 22a | support system—second embodiment |
| 22b | support system—third embodiment |
| 23 | corner of triangle |
| 24 | telescope mirror |
| 25 | circumference of first circle |
| 26 | center of first circle |
| 27 | line |
| 28 | back of mirror |
| 29 | center of mirror |
| 30 | primary elastomeric pad |
| 31 | secondary elastomeric pad |
| 32 | back of bar |
| 36 | adjusting screw |
| 38 | front of telescope backplate |
| 40 | rear of telescope |
| 42 | spring |
| 44 | head of adjusting screw |
| 46 | nut |
| 50 | circumference of second circle |
| 52 | center of second circle |
| 53 | tertiary elastomeric pad |
| 54 | circumference of third circle |
| 56 | center of third circle |

This improved mirror mounting system 22, 22a, 22b for telescopes has been described with reference to a particular embodiment. Other modifications and enhancements can be made without departing from the spirit and scope of the claims that follow.

What is claimed is:

1. A mount for a telescope mirror, the telescope having three adjustment means for longitudinal adjustment of said mirror within said telescope, said mount comprising:

a. a set of three crossbars; each of said crossbars having an end center point at each end, and a center point; each of said crossbars being located between the rear of said mirror and said adjustment means so that one of said end center points is coincident with the center of said mirror, the remaining end center points fall on the circumference of a circle whose center is coincident with the center of said mirror, the shortest line drawn connecting all three centers of said crossbars forms an angle of about 90°, and a line drawn through said remaining end center points forms a pentagon; each of said center points being aligned with the longitudinal axis of one of said adjustment means;

b. first elastomeric pads, located at each of said ends, adhering each of said crossbars to said rear of said mirror; the areas of said first elastomeric pads being small in relation to the areas of each of said crossbars; the thicknesses of said first elastomeric pads providing stiff support in compression and shear along with resilient support in bending; and c. second elastomeric pads, located at each of said center points, adhering each of said crossbars to one of said adjustment means; the areas of said second elastomeric pads being small in relation to the areas of said crossbars; the thicknesses of said second elastomeric pads providing stiff support in compression and shear along with resilient support in bending.

2. A mount for a telescope mirror, the telescope having three adjustment means for longitudinal adjustment of said mirror within said telescope, said mount comprising:

a. a set of three primary crossbars; each of said primary crossbars having an end center point at each end, and a center point; each of said primary crossbars being located between the rear of said mirror and said adjustment means so that one of said end center points is coincident with the center of said mirror, the remaining end center points fall on the circumference of a circle whose center is coincident with the center of said mirror, the shortest line drawn connecting all three centers of said primary crossbars forms an angle of about 90°, and a line drawn through said remaining end center points forms a pentagon; each of said center points being aligned with the longitudinal axis of one of said adjustment means;

b. a set of five secondary crossbars; each of said secondary crossbars having an end center point at each end, and a center point; each of said secondary crossbars being located between said rear of said mirror and said primary crossbars so that each of said center points of said secondary crossbars is aligned with one of said remaining end center points of said primary crossbars and each of said end center points of said secondary crossbars falls on the circumference of a second circle whose center is coincident with the center of said mirror;

c. first elastomeric pads, located at each of said ends of said secondary crossbars, adhering each of said secondary crossbars to said rear of said mirror; the areas of said first elastomeric pads being small in relation to the areas of each of said secondary crossbars; the thicknesses of said first elastomeric pads providing stiff support in compression and shear along with resilient support in bending;

d. second elastomeric pads, located at each of said center points of said primary crossbars, adhering each of said primary crossbars to one of said adjustment means; the areas of said second elastomeric pads being small in relation to the areas of said primary crossbars; the thicknesses of said second elastomeric pads providing stiff support in compression and shear along with resilient support in bending; and e. third elastomeric pads, located at each of said center points of said secondary crossbars, adhering each of said secondary crossbars to the ends of said primary crossbars; the areas of said third elastomeric pads being small in relation to the areas of said crossbars; the thicknesses of said third elastomeric pads providing stiff support in compression and shear along with resilient support in bending.

3. A mount for a telescope mirror, the telescope having three adjustment means for longitudinal adjustment of said mirror within said telescope, said mount comprising:

a. a set of three primary crossbars; each of said primary crossbars having an end center point at each end, and a center point; each of said primary crossbars being located between the rear of said mirror and said adjustment means so that one of said end center points is coincident with the center of said mirror, the remaining end center points fall on the circumference of a circle whose center is coincident with the center of said mirror, the shortest line drawn connecting all three centers of said primary crossbars forms an angle of about 90°, and a line drawn through said remaining end center points forms a pentagon; each of said center points being aligned with the longitudinal axis of one of said adjustment means;

b. a set of five secondary triangles; each of said secondary triangles having a corner center point at each corner, and a center point; each of said secondary triangles being located between said rear of said mirror and said primary crossbars so that one corner of each triangle points to the center of said mirror, each of said center points of said secondary triangles is aligned with one of said remaining end center points of said primary crossbars, each outer corner center point falls on the circumference of a second circle whose center is coincident with the center of said mirror and each inner corner center point falls on the circumference of a third circle whose center is coincident with the center of said mirror;

c. first elastomeric pads, located at each of said corner center points, adhering each of said triangles to said rear of said mirror; the areas of said first elastomeric pads being small in relation to the areas of each of said secondary triangles; the thicknesses of said first elastomeric pads providing stiff support in compression and shear along with resilient support in bending;

d. second elastomeric pads, located at each of said center points of said primary crossbars, adhering each of said primary crossbars to one of said adjustment means; the areas of said second elastomeric pads being small in relation to the areas of said primary crossbars; the thicknesses of said second elastomeric pads providing stiff support in compression and shear along with resilient support in bending; and e. third elastomeric pads, located at each of said center points of said triangles, adhering each of said triangles to the ends of said primary crossbars; the areas of said third elastomeric pads being small in relation to the areas of said primary crossbars; the thicknesses of said third elastomeric pads providing stiff support in compression and shear along with resilient support in bending.

4. A method of mounting a mirror to a telescope, the telescope having three adjustment means for longitudinal adjustment of said mirror within said telescope, comprising the steps of:

a. fabricating a set of three crossbars; each of said crossbars having an end center point at each end, and a center point;

b. placing a quantity of uncured elastomeric adhesive on each of said ends and on said center point;

c. placing spacers against the rear of said mirror and around said means for longitudinal adjustment;

d. positioning said crossbars on said spacers so that there is no gap between said crossbars and said spacers, said adhesive makes intimate contact with said rear of said mirror; and said means for longitudinal adjustment, one of said end center points is coincident with the center of said mirror, the remaining end center points fall on the circumference of a circle whose center is coincident with the center of said mirror, the shortest line drawn connecting all three centers of said crossbars forms an angle of about 90°, a line drawn through said remaining end center points forms a pentagon, and each of said center points is aligned with the longitudinal axis of one of said adjustment means;

e. allowing said adhesive to cure; and f. removing said spacers.

5. A method of mounting a mirror to a telescope, the telescope having three adjustment means for longitudinal adjustment of said mirror within said telescope, comprising the steps of:

a. fabricating a set of three primary crossbars; each of said primary crossbars having an end center point at each end, and a center point;

b. fabricating a set of five secondary crossbars; each of said secondary crossbars having an end center point at each end, and a center point;

c. placing a quantity of uncured elastomeric adhesive on each of said ends and center points;

d. placing spacers against the rear of said mirror, around said means for longitudinal adjustment and between said primary and secondary crossbars;

e. positioning said primary and secondary crossbars on said spacers so that there is no gap between said crossbars and said spacers, said adhesive makes intimate contact with said rear of said mirror, said means for longitudinal adjustment and said primary and secondary crossbars, one of said end center points of said primary crossbars is coincident with the center of said mirror, the remaining end center points of said primary crossbars fall on the circumference of a circle whose center is coincident with the center of said mirror, the shortest line drawn connecting all three centers of said primary crossbars forms an angle of about 90°, a line drawn through said remaining end center points of said primary crossbars forms a pentagon, each of said center points of said primary crossbars is aligned with the longitudinal axis of one of said adjustment means, each of said center points of said secondary crossbars is aligned with one of said remaining end center points of said primary crossbars, and each of said end center points of said secondary crossbars falls on the circumference of a second circle whose center is coincident with the center of said mirror;

f. allowing said adhesive to cure; and g. removing said spacers.

6. A method of mounting a mirror to a telescope, the telescope having three adjustment means for longitudinal adjustment of said mirror within said telescope, comprising the steps of:

a. fabricating a set of three primary crossbars; each of said primary crossbars having an end center point at each end, and a center point;

b. fabricating a set of five secondary triangles; each of said secondary triangles having a corner center point at each corner, and a center point;

c. placing a quantity of uncured elastomeric adhesive on each of said ends, corners and center points;

d. placing spacers against the rear of said mirror, around said means for longitudinal adjustment and between said primary crossbars and secondary triangles;

e. positioning said primary crossbars and secondary triangles on said spacers so that there is no gap between said primary crossbars and said spacers as well as between said secondary triangles and said spacers, said adhesive makes intimate contact with said rear of said mirror, said means for longitudinal adjustment, said primary crossbars and secondary triangles, one of said end center points of said primary crossbars is coincident with the center of said mirror, the remaining end center points of said primary crossbars fall on the circumference of a circle whose center is coincident with the center of said mirror, the shortest line drawn connecting all three centers of said primary crossbars forms an angle of about 90°, a line drawn through said remaining end center points of said primary crossbars forms a pentagon, each of said center points of said primary crossbars is aligned with the longitudinal axis of one of said adjustment means, each of said center points of said secondary triangles is aligned with one of said remaining end center points of said primary crossbars, one corner of each triangle points to the center of said mirror, each of said center points of said secondary triangles is aligned with one of said remaining end center points of said primary crossbars, each outer corner center point falls on the circumference of a second circle whose center is coincident with the center of said mirror and each inner corner center point falls on the circumference of a third circle whose center is coincident with the center of said mirror;

f. allowing said adhesive to cure; and g. removing said spacers.

\* \* \* \* \*